Patented Aug. 4, 1931

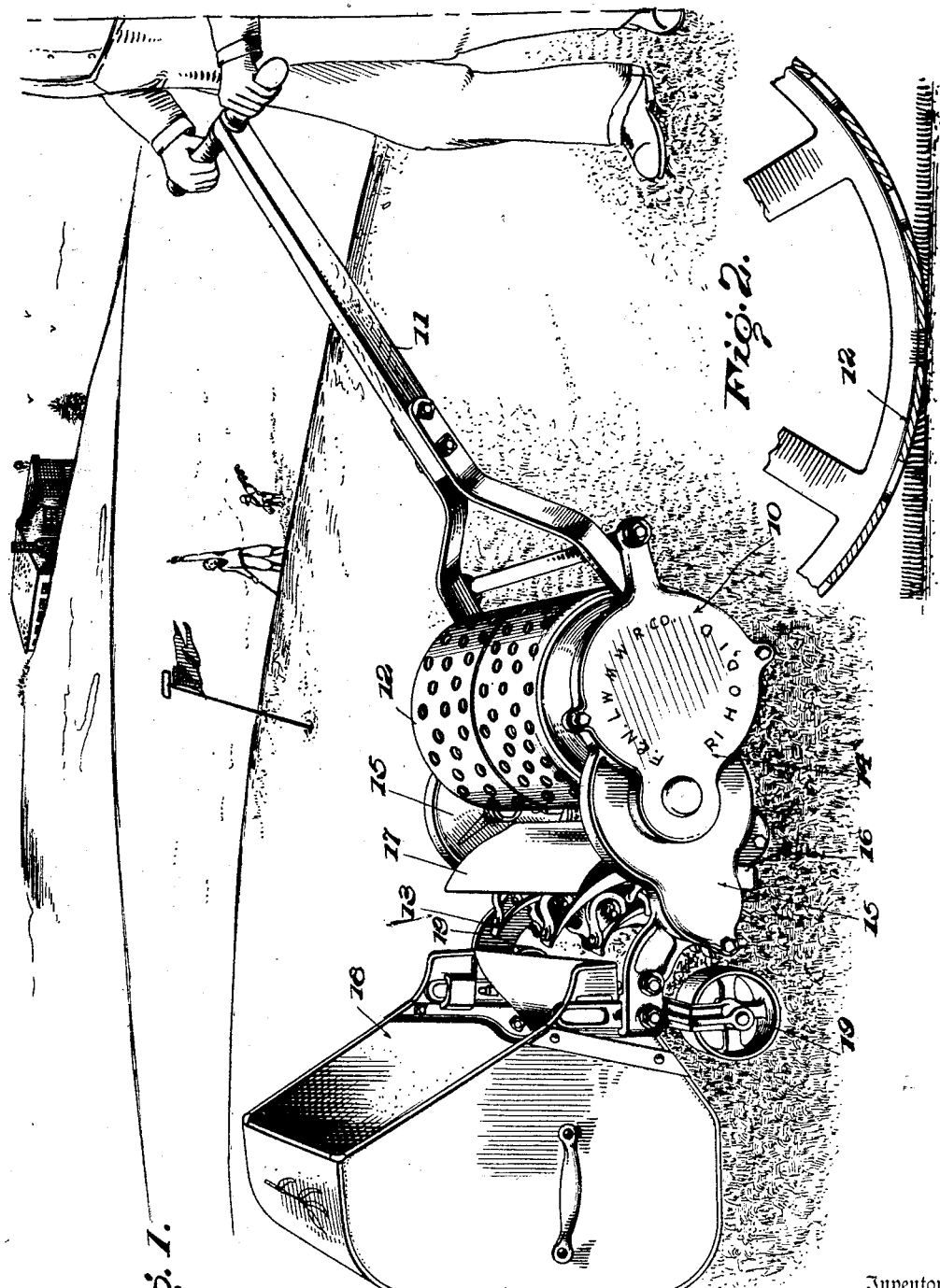

1,816,980

UNITED STATES PATENT OFFICE

HARRY R. LONTZ, OF RICHMOND, INDIANA, ASSIGNOR TO F. & N. LAWN MOWER COMPANY, OF RICHMOND, INDIANA, A CORPORATION OF INDIANA

MOWING MACHINE

Application filed October 16, 1928. Serial No. 312,866.

This invention relates to mowing machines, and more particularly to putting greens mowers of the manually operated type. Mowers of this type must be designed to cut thick, heavy growths of grass, and must cut evenly and closely to a minimum cut for instance of one-eighth of an inch. These requirements necessitate the use of a cutting reel having a large number of blades, and geared to run at high speed thus requiring more power to operate than the ordinary lawn mower. Moreover, since putting greens are kept well watered, the usual type of traction wheel would scar or mar the surface thereof so as to render it undesirable or unfit for play.

The substitution of driving rollers extending the full width of the machine instead of the ordinary driving wheel is therefore necessary, but it has been found that smooth driving rollers may not always have sufficient traction on the surface of the green to operate the cutting reel in a satisfactory manner when the gear ratio is high and the grass is thick. It has been proposed to use corrugated driving rollers in order to obviate this difficulty, but the corrugated rollers have been found to be undesirable for the same reason as the ordinary driving wheels, namely, the corrugations scar the surface of the green.

It is an object of the present invention therefore to provide a mower for putting greens having adequate driving traction, but which will not scar the surface of the green.

Another object of the invention is the provision of such a device embodying means for preventing slipping of the driving mechanism through tractive engagement with the grass itself but not directly with the ground underneath.

Other objects and advantages will be apparent to those skilled in the art as the description proceeds taken in connection with the accompanying drawings.

In the drawings,—

Fig. 1 is a perspective view of a mower embodying the present invention in operation; and Fig. 2 is a detail in vertical section of the novel traction roller in engagement with the surface of the green.

Referring to the drawings, numeral 10 indicates generally the frame work of the mower, and numeral 11 a handle suitably pivoted thereto. Driving rollers 12 are journaled in the frame in any suitable manner, and operate a cutting reel 13 by means of suitable multiplying gears housed within the gear casings 14 and 15, as well known in the art. The cutting reel cooperates with a stationary knife blade on the cutter bar 16, and a shield 17 is provided adjacent the reel whereby the grass cuttings are guided to fall within a suitable hopper 18 attached to the forward end of the frame 10. Carrying wheels 19 are also mounted on the forward end of the frame 10 and are vertically adjustable with respect thereto in order to vary the height of the cut.

According to the present invention the rollers 12 are provided with smooth cylindrical external surfaces, and openings are pierced therein to form pockets which are adapted to receive the grass blades over which the rollers are passing. These openings are preferably formed in staggered rows, and take up a minor proportion of the surface of the rollers. It has been found, for instance, that openings about one and one-quarter inches in diameter and staggered about three inches apart, provide adequate traction without seriously reducing the area of the rollers in contact with the green.

It is to be noted that with this type of traction increasing structure the anti-skid engagement of the rollers is with the grass itself, and the heavier and thicker the growth of grass the greater is the power which may be transmitted therethrough, so that adequate traction is at all times secured without the use of any corrugations or projections which might mar the surface of the green.

Although but one embodiment of the invention has been shown and described in detail, it is to be expressly understood that the illustrated embodiment is not exclusive, and various changes may be made in the construction, arrangement and proportion of parts, without departing from the spirit of the invention. Reference is therefore to be had to the claims hereto appended for a definition of the limits of the invention.

What is claimed is:

1. In a putting green mower, hollow driving and supporting means extending across the entire width of the mower and having a substantially smooth cylindrical ground engaging periphery provided radially and axially with series of openings extending therethrough and adapted to increase the tractive effect of said means.

2. In a putting green mower, a plurality of hollow driving rollers providing a substantially smooth cylindrical ground engaging surface extending across the entire width of the mower and formed radially and axially at intervals with series of openings to receive the grass stems and provide a gripping contact with the green.

3. A mower provided with juxtaposed hollow ground engaging driving rollers extending across the entire width of the mower and having radially and axially arranged series of openings extending in staggered relation through the cylindrical walls of said rollers for increasing the traction thereof.

4. A mower provided with juxtaposed hollow driving members having relatively thin cylindrical walls forming a ground engaging surface extending across the entire width of the mower and having radially and axially extending series of openings for increasing the traction of said surface.

In testimony whereof I have signed this specification.

HARRY R. LONTZ.